United States Patent
Tsai et al.

(10) Patent No.: US 10,326,935 B1
(45) Date of Patent: Jun. 18, 2019

(54) IN-VEHICLE DRIVING IMAGE MAP DATA ESTABLISHMENT SYSTEM

(71) Applicant: Hua-Chuang Automobile Information Technical Center Co., Ltd., New Taipei (TW)

(72) Inventors: Ming-Fong Tsai, New Taipei (TW); Chia-Yuan Lin, New Taipei (TW); Fu-Shiang Ching, New Taipei (TW); Chih-Ming Lin, New Taipei (TW); Chung-Yuan Chang, New Taipei (TW)

(73) Assignee: HUA-CHUANG AUTOMOBILE INFORMATION TECHNICAL CENTER CO., LTD., New Taipei (TW)

( * ) Notice: Subject to any disclaimer, the term of this patent is extended or adjusted under 35 U.S.C. 154(b) by 0 days.

(21) Appl. No.: 15/963,508

(22) Filed: Apr. 26, 2018

(30) Foreign Application Priority Data

Dec. 18, 2017 (CN) .......................... 2017 1 1368883

(51) Int. Cl.
| | | |
|---|---|---|
| *H04N 9/47* | (2006.01) | |
| *H04N 7/18* | (2006.01) | |
| *H04N 5/232* | (2006.01) | |
| *G06K 9/00* | (2006.01) | |
| *H04W 4/40* | (2018.01) | |

(52) U.S. Cl.
CPC ..... *H04N 5/23245* (2013.01); *G06K 9/00791* (2013.01); *H04N 7/18* (2013.01); *H04W 4/40* (2018.02)

(58) Field of Classification Search
None
See application file for complete search history.

(56) References Cited

U.S. PATENT DOCUMENTS

| | | | | |
|---|---|---|---|---|
| 9,815,368 | B2* | 11/2017 | Verheijen | B60R 16/0236 |
| 2004/0119612 | A1* | 6/2004 | Chen | G08G 1/0104 |
| | | | | 340/995.13 |
| 2010/0164753 | A1* | 7/2010 | Free | G08G 1/096725 |
| | | | | 340/932 |
| 2014/0188310 | A1* | 7/2014 | Hatfield | B60R 16/0231 |
| | | | | 701/2 |
| 2017/0061793 | A1* | 3/2017 | Witte | G08G 1/012 |
| 2017/0256162 | A1* | 9/2017 | Schilling | G09B 29/003 |

\* cited by examiner

*Primary Examiner* — Talha M Nawaz
(74) *Attorney, Agent, or Firm* — Muncy, Geissler, Olds & Lowe, P.C.

(57) ABSTRACT

An in-vehicle driving image map data establishment system is provided, and includes an image capture apparatus, a vehicle speed unit, and a control apparatus. The image capture apparatus continuously captures and outputs a plurality of outside-vehicle images. The vehicle speed unit continuously detects and outputs real-time vehicle speed information. The control apparatus is electrically connected to the image capture apparatus and the vehicle speed unit, the control apparatus continuously receives the real-time vehicle speed information, and the control apparatus selectively controls, when the real-time vehicle speed information is greater than a threshold, the image capture apparatus to capture the outside-vehicle images at a first frequency, or the control apparatus selectively controls, when the real-time vehicle speed information is less than the threshold, the image capture apparatus to capture the outside-vehicle images at a second frequency, in which the second frequency is less than the first frequency.

10 Claims, 5 Drawing Sheets

IN-VEHICLE DRIVING IMAGE MAP DATA ESTABLISHMENT SYSTEM

CROSS-REFERENCE TO RELATED APPLICATION

This non-provisional application claims priority under 35 U.S.C. § 119(a) to Patent Application No. 201711368883.1 filed in China, P.R.C. on Dec. 18, 2017, the entire contents of which are hereby incorporated by reference.

BACKGROUND

Technical Field

The present disclosure relates to a map data establishment system, and in particular, to an in-vehicle driving image map data establishment system.

Related Art

With the development and progress of the times, the instruction cycle of the Internet and the connection capability of a network device are improved continuously. Therefore, various devices can be connected to each other via networks, and a great variety of Internet of Vehicles applications come into being. For example, making of a street view map, real-time road condition monitoring, or cloud driving recording are achieved all by uploading, via the Internet, road condition images shot by vehicles.

However, currently, when a vehicle uploads a road condition image, it cannot be ensured that the vehicle is located in a good network environment. For example, during driving, signal strength of a vehicle network varies according to different geographical environments of a vehicle, and subsequently, available bandwidth of the vehicle network cannot be maintained stable, easily causing a result that the available bandwidth cannot satisfy a required image transmission quantity, and further affecting quality of map data establishment.

SUMMARY

In view of this, an embodiment provides an in-vehicle driving image map data establishment system, including an image capture apparatus, a vehicle speed unit, and a control apparatus. The image capture apparatus continuously captures and outputs a plurality of outside-vehicle images. The vehicle speed unit continuously detects and outputs real-time vehicle speed information. The control apparatus is electrically connected to the image capture apparatus and the vehicle speed unit, the control apparatus continuously receives the real-time vehicle speed information, and the control apparatus selectively controls, when the real-time vehicle speed information is greater than a threshold, the image capture apparatus to capture the outside-vehicle images at a first frequency, or the control apparatus selectively controls, when the real-time vehicle speed information is less than the threshold, the image capture apparatus to capture the outside-vehicle images at a second frequency, in which the second frequency is less than the first frequency.

In summary, in the in-vehicle driving image map data establishment system in this embodiment of the present disclosure, a frequency at which the image capture apparatus captures the outside-vehicle images can be adjusted according to a change of the real-time vehicle speed information. For example, when a vehicle speed is less than 30 km/h, the control apparatus controls the image capture apparatus to capture the outside-vehicle images at a frequency of three images per second; when the vehicle speed is between 30 km/h and 40 km/h, the control apparatus controls the image capture apparatus to capture the outside-vehicle images at a frequency of five images per second, so as to reduce a quantity of the outside-vehicle images and a file size of each of the outside-vehicle images to be uploaded (for example, uploaded to the cloud for making of a street view map, real-time road condition monitoring, or cloud driving recording), and further reduce load of network bandwidth, effectively improving the quality and efficiency of map data establishment.

BRIEF DESCRIPTION OF THE DRAWINGS

The present disclosure will become more fully understood from the detailed description given herein below for illustration only, and thus are not limitative of the present disclosure, and where.

DETAILED DESCRIPTION

Figure 1:
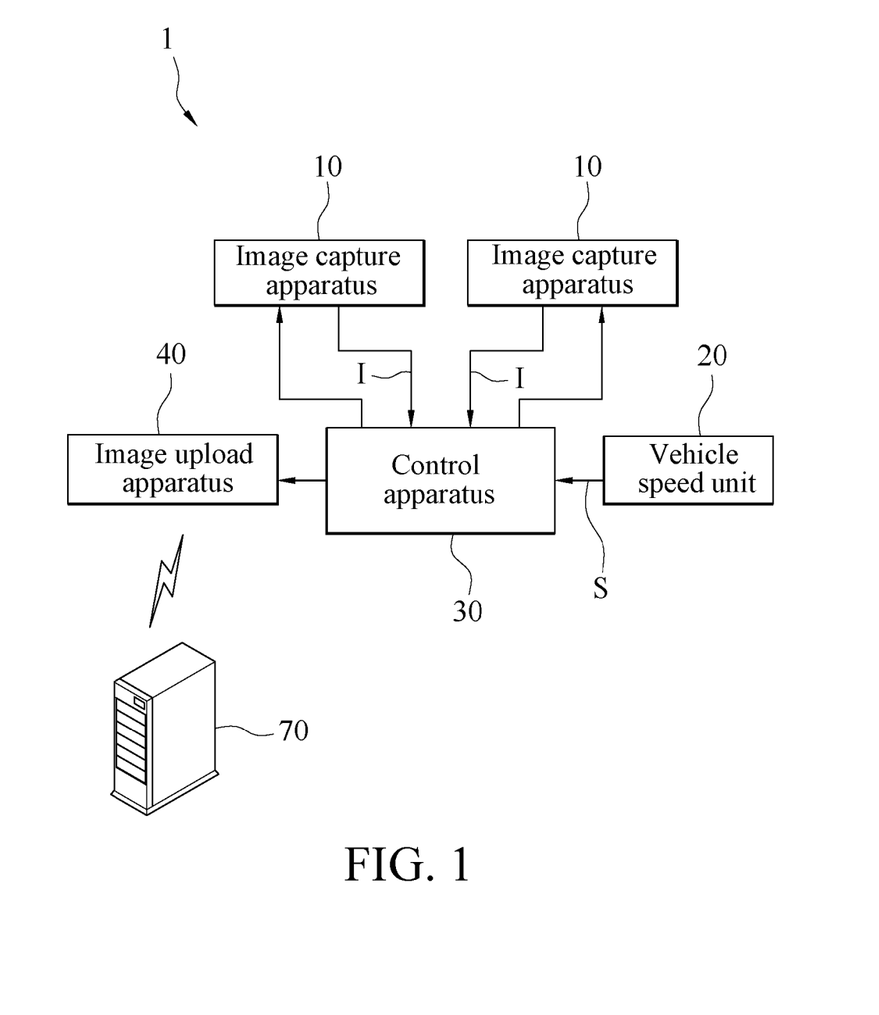
FIG. 1 is a system block diagram of an embodiment of an in-vehicle driving image map data establishment system.

Referring to FIG. 1, FIG. 1 is a system block diagram of an embodiment of an in-vehicle driving image map data establishment system. In this embodiment, the in-vehicle driving image map data establishment system 1 includes at least one image capture apparatus 10, a vehicle speed unit 20, and a control apparatus 30. The in-vehicle driving image map data establishment system 1 may be applied to a remote system that requires a vehicle to upload, via a network, an image to establish map data, such as a system for making of a street view map, real-time road condition monitoring, or cloud driving recording.

Figure 2:
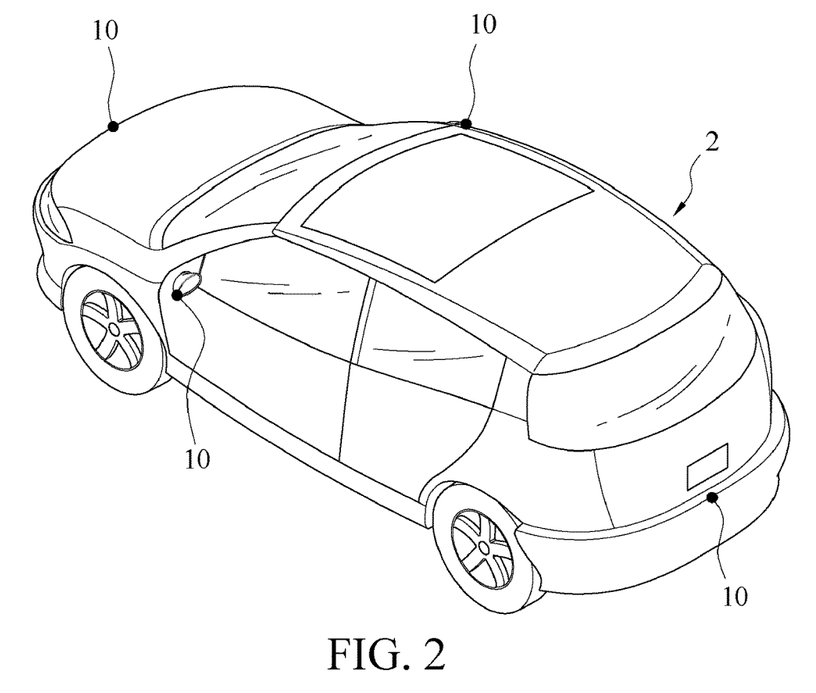
FIG. 2 is a schematic diagram of a vehicle in an embodiment of an in-vehicle driving image map data establishment system.

In an embodiment, the in-vehicle driving image map data establishment system 1 may be disposed in a vehicle 2. As shown in FIG. 2, in this embodiment, the in-vehicle driving image map data establishment system 1 includes a plurality of image capture apparatuses 10 (there are four image capture apparatuses 10 herein). The image capture apparatuses 10 may be specifically camera. These image capture apparatuses 10 are mounted at different locations on the vehicle 2 to respectively capture the outside-vehicle images I. For example, these image capture apparatuses 10 may be respectively mounted at a front side (such as an engine cover or a front air intake vent), a rear side (such as a rear trunk), a left side (such as a left rear-view mirror), and a right side (such as a right rear-view mirror) of the vehicle 2, to respectively capture the outside-vehicle images I around the vehicle 2. Actually, a quantity, locations, and angles of the image capture apparatuses 10 may all be adjusted according to an actual requirement. The foregoing is only an example, but is not used for limitation.

Figure 3:
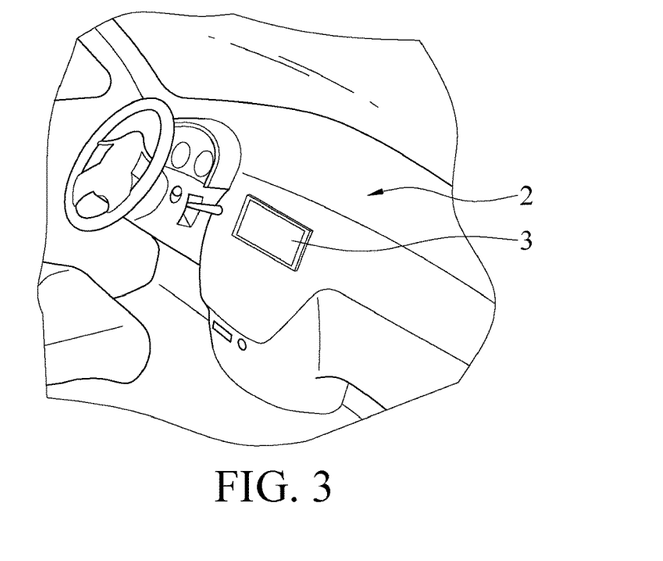
FIG. 3 is a schematic internal diagram of a vehicle in an embodiment of an in-vehicle driving image map data establishment system.

As shown in FIG. 1 and FIG. 3, the vehicle speed unit 20 and the control apparatus 30 may be integrated in a dashboard apparatus 3 in the vehicle 2, but are not limited to this. The vehicle speed unit 20 and the control apparatus 30 may be alternatively independent components and respectively disposed at different locations in the vehicle 2.

As shown in FIG. 1, the vehicle speed unit 20 may continuously detect and output real-time vehicle speed information S. For example, the vehicle speed unit 20 may be specifically a speed meter (such as a mechanical speed meter or an electronic speed meter), to detect current real-time vehicle speed information S of the vehicle 2 (for example, a current speed is 30 km/h, 40 km/h, 50 km/h, or 60 km/h). For example, when the vehicle speed unit 20 is a mechanical speed meter, the mechanical speed meter runs via a gear and shaft assembly, to measure a magnetic pole change caused by magnet rotation driven by the gear, so that a real-time speed of the vehicle 2 can be detected and the real-time vehicle speed information S can be output. For example, when the vehicle speed unit 20 is an electronic speed meter, the vehicle speed unit 20 obtains information from a speed sensor in a transmission, to detect a real-time speed of the vehicle 2 and output the real-time vehicle speed information S.

In an embodiment, the vehicle speed unit 20 may be alternatively a global positioning system (GPS) speed meter. For example, the GPS speed meter may continuously receive a GPS location of the vehicle 2, to calculate a real-time speed of the vehicle 2 according to a change of the GPS location and output the real-time vehicle speed information S. Still alternatively, in another embodiment, the vehicle speed unit 20 may be a radar speed meter. For example, the radar speed meter may continuously transmit a radar signal, calculate a driving speed of the vehicle 2 according to a change value between a transmit frequency of the radar signal and a frequency of a reflected signal, and output the real-time vehicle speed information S.

As shown in FIG. 1, in an embodiment, the control apparatus 30 may be specifically a micro-processor, a micro-controller, a digital signal processor, a micro-computer, a central processing unit, a field programmable gate array, a programmable logic device, a state machine, a logic circuit, an analog circuit, or a digital circuit. In this embodiment, the control apparatus 30 is electrically connected to the image capture apparatus 10 and the vehicle speed unit 20. The control apparatus 30 may continuously receive the real-time vehicle speed information S transmitted by the vehicle speed unit 20, and the control apparatus 30 may control, when the real-time vehicle speed information S is greater than a threshold, the at least one image capture apparatus 10 to capture the outside-vehicle images I at a first frequency, or the control apparatus 30 controls, when the real-time vehicle speed information S is less than the threshold, the image capture apparatus 10 to capture the outside-vehicle images I at a second frequency less than the first frequency. For example, at least one threshold (such as 30 km/h) may be preset for the in-vehicle driving image map data establishment system 1. When the real-time vehicle speed information S is less than 30 km/h (for example, the real-time vehicle speed information S is 28 km/h), the control apparatus 30 controls the image capture apparatus 10 to capture the outside-vehicle images I at a frequency of three images per second; or when the real-time vehicle speed information S is greater than 30 km/h (for example, the real-time vehicle speed information S is 35 km/h), the control apparatus 30 controls the image capture apparatus 10 to capture the outside-vehicle images I at a frequency of five images per second. However, the foregoing embodiment is only an example. Actually, a plurality of thresholds (such as 30 km/h, 40 km/h, or 50 km/h) may be preset for the in-vehicle driving image map data establishment system 1. When the real-time vehicle speed information S is within different threshold ranges, the control apparatus 30 controls the image capture apparatus 10 to capture the outside-vehicle images I at different frequencies. For example, in the following Table 1, a larger value of the real-time vehicle speed information S indicates a higher frequency at which the image capture apparatus 10 captures the outside-vehicle images I under the control of the control apparatus 30.

TABLE 1

| Vehicle speed | Less than 30 km/h | 30 km/h | 45 km/h | 60 km/h | 75 km/h | Higher than 75 km/h |
|---|---|---|---|---|---|---|
| Quantity of images captured per second | 3 | 5 | 6 | 7 | 8 | 9 |

Therefore, in the in-vehicle driving image map data establishment system 1 in this embodiment of the present disclosure, a frequency at which the image capture apparatus 10 captures the outside-vehicle images I can be adjusted according to a change of the real-time vehicle speed information S, so that a quantity of the outside-vehicle images I and a file size of each of the outside-vehicle images I to be uploaded (for example, uploaded to the cloud for making of a street view map, real-time road condition monitoring, or cloud driving recording) can be reduced, thereby reducing load of network bandwidth, preventing a case of insufficient bandwidth from occurring, and effectively improving the quality and efficiency of map data establishment. For example, as shown in FIG. 1, the in-vehicle driving image map data establishment system 1 may include an image upload apparatus 40 (such as an antenna module, a WiFi module, or a 3G/4G module). The image upload apparatus 40 is electrically connected to the control apparatus 30 and the image capture apparatus 10 to receive the outside-vehicle images I, and the image upload apparatus 40 can upload the outside-vehicle images I to a cloud server 70 for making of map data, real-time road condition monitoring, or cloud driving recording.

For another example, as shown in FIG. 1, in an embodiment, the control apparatus 30 may further control an upload frequency of the image upload apparatus 40. For example, the control apparatus 30 further controls, when the real-time vehicle speed information S is greater than a threshold, the image upload apparatus 40 to wirelessly transmit the outside-vehicle images I to the outside at a third frequency, or the control apparatus 30 further controls, when the real-time vehicle speed information S is less than the threshold, the image upload apparatus 40 to wirelessly transmit the outside-vehicle images I to the outside at a fourth frequency less than the third frequency. For example, at least one threshold (such as 40 km/h) may be preset for the in-vehicle driving image map data establishment system 1. When the real-time vehicle speed information S is less than 40 km/h (for example, the real-time vehicle speed information S is 38 km/h), the control apparatus 30 may control the image capture apparatus 10 to capture the outside-vehicle images I at a frequency of three images per second and simultaneously control the image upload apparatus 40 to upload the outside-vehicle images I at a frequency of three images per second (that is, the first frequency may be equal to the third frequency), or when the real-time vehicle speed information S is greater than 40 km/h (for example, the real-time vehicle speed information S is 45 km/h), the control apparatus 30 may control the image capture apparatus 10 to capture the outside-vehicle images I at a frequency of five images per second and simultaneously control the image upload apparatus 40 to upload the outside-vehicle images I at a frequency of five images per second (that is, the second frequency may be equal to the fourth frequency).

In another embodiment, the control apparatus 30 may further control a transmission frequency of the image upload apparatus 40 to be less than a capture frequency of the image capture apparatus 10. For example, when the real-time vehicle speed information S is less than 40 km/h (for example, the real-time vehicle speed information S is 38 km/h), the control apparatus 30 may control the image capture apparatus 10 to capture the outside-vehicle images I at a frequency of three images per second and simultaneously control the image upload apparatus 40 to upload the outside-vehicle images I at a frequency of two images per second (that is, the first frequency is greater than the third frequency), or when the real-time vehicle speed information S is greater than 40 km/h (for example, the real-time vehicle speed information S is 45 km/h), the control apparatus 30 may control the image capture apparatus 10 to capture the outside-vehicle images I at a frequency of five images per second and simultaneously control the image upload apparatus 40 to upload the outside-vehicle images I at a frequency of four images per second (that is, the second frequency is greater than fourth frequency). Therefore, in this embodiment, the upload frequency of the image upload apparatus 40 can be further adjusted according to a change of the real-time vehicle speed information S, so as to further reduce a quantity of the outside-vehicle images I and a file size of each of the outside-vehicle images I to be uploaded, and prevent a case of insufficient bandwidth from occurring.

Figure 4:
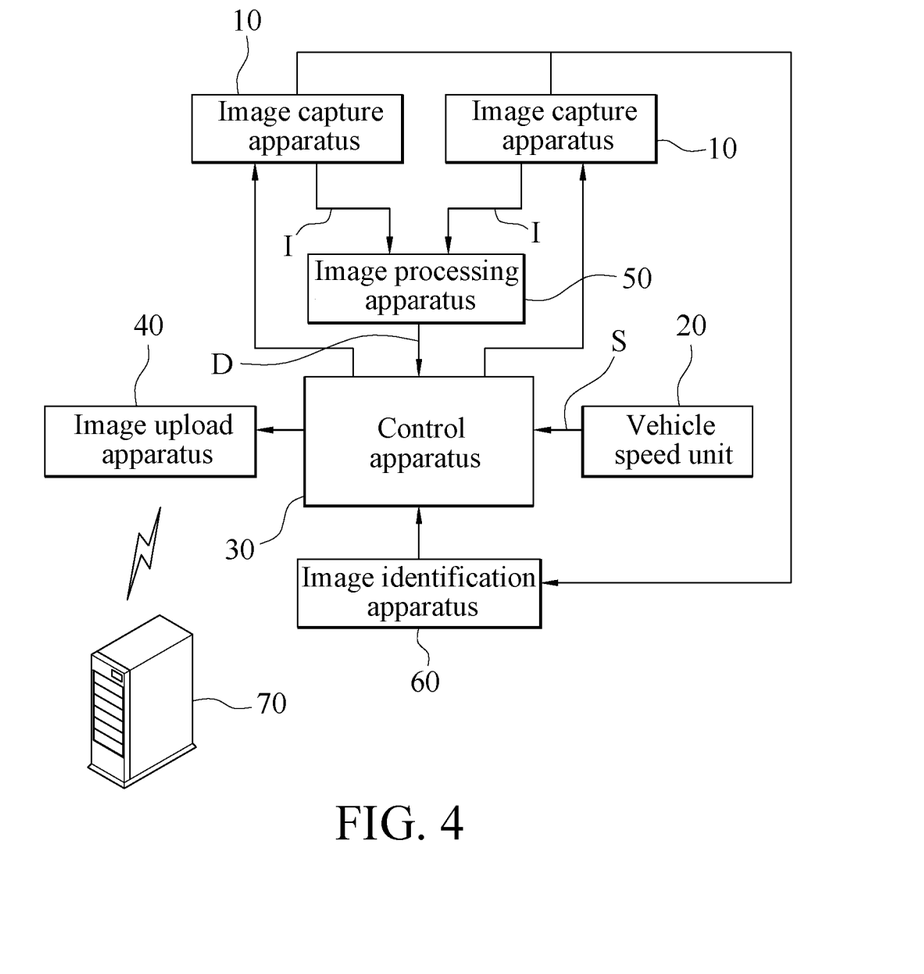
FIG. 4 is a system block diagram of another embodiment of an in-vehicle driving image map data establishment system.

Referring to FIG. 4, FIG. 4 is a system block diagram of another embodiment of an in-vehicle driving image map data establishment system. In this embodiment, the in-vehicle driving image map data establishment system 1 further includes an image processing apparatus 50, electrically connected to the image capture apparatus 10. The image processing apparatus 50 may receive the outside-vehicle images I that are shot by the image capture apparatus 10 and correspondingly output a plurality of processed images D, and a data amount of each of the processed images D is less than a data amount of each of the outside-vehicle images I. For example, the data amount of each of the outside-vehicle images I is 2 MB, and the data amount of the processed image D obtained after the image processing apparatus 50 processes each of the outside-vehicle images I may be changed to 1 MB. The image upload apparatus 40 may be electrically connected to the image processing apparatus 50, to wirelessly transmit these processed images D to the cloud server 70, so as to further reduce a file size of each of the outside-vehicle images I to be uploaded, thereby further reducing the load of the network bandwidth, and continuously uploading the map data in limited and constantly-changing vehicle network bandwidth.

Figure 5:
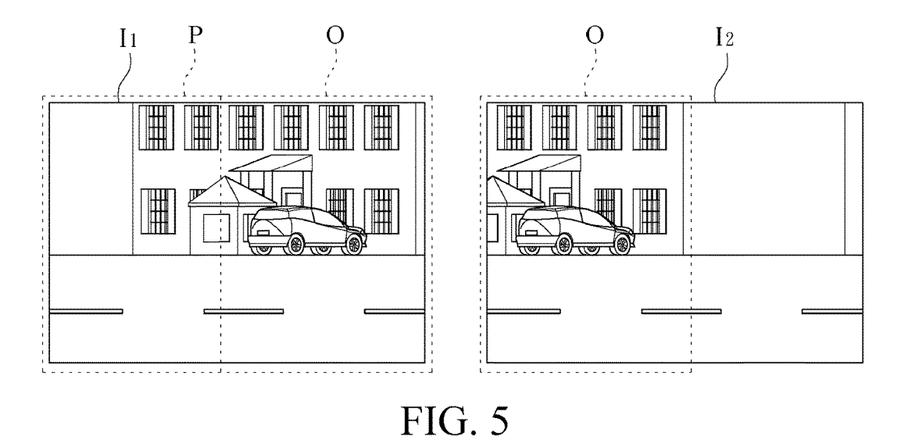
FIG. 5 is a schematic diagram of image capture in an embodiment of an in-vehicle driving image map data establishment system.
Figure 6:
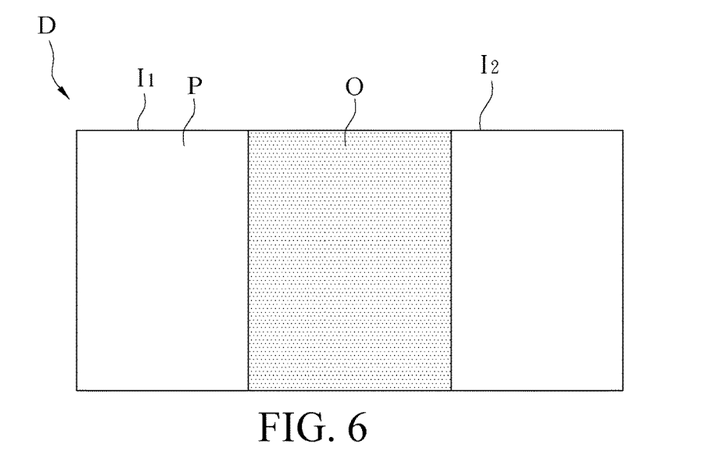
FIG. 6 is a schematic diagram of image processing in FIG. 5.

In some embodiments, the image processing apparatus 50 may process the outside-vehicle images I into the processed images D in the following plurality of manners. For example, as shown in FIG. 5 and FIG. 6, in an embodiment, the image processing apparatus 50 may combine two adjacent outside-vehicle images I1 and I2 into one processed image D, to further reduce a file size of the two outside-vehicle images I1 and I2. For example, in this embodiment, the two adjacent outside-vehicle images I1 and I2 are consecutive images captured by the image capture apparatus 10 at a frequency (such as a frequency of two images per second). It can be seen from FIG. 5 and FIG. 6 that the two adjacent outside-vehicle images I1 and I2 have an overlap area O. The image processing apparatus 50 may remove the overlap area O in the outside-vehicle image I1, and then merge a remaining partial image P of the outside-vehicle image I1 with the outside-vehicle image I2 to form the processed image D. Therefore, compared with the two outside-vehicle images I1 and I2, in the processed image D, one image of the overlap area O is removed. Therefore, a file size of the processed image D is less than a sum of file sizes of the two outside-vehicle images I1 and I2. For example, the sum of the file sizes of the original two outside-vehicle images I1 and I2 is 2 MB, and the file size of the processed image D may be changed to 1.5 MB. The image upload apparatus 40 uploads the processed image D. Therefore, compared with upload of the two outside-vehicle images I1 and I2, the file size of the outside-vehicle images I1 and I2 to be uploaded can be further reduced.

Figure 7:
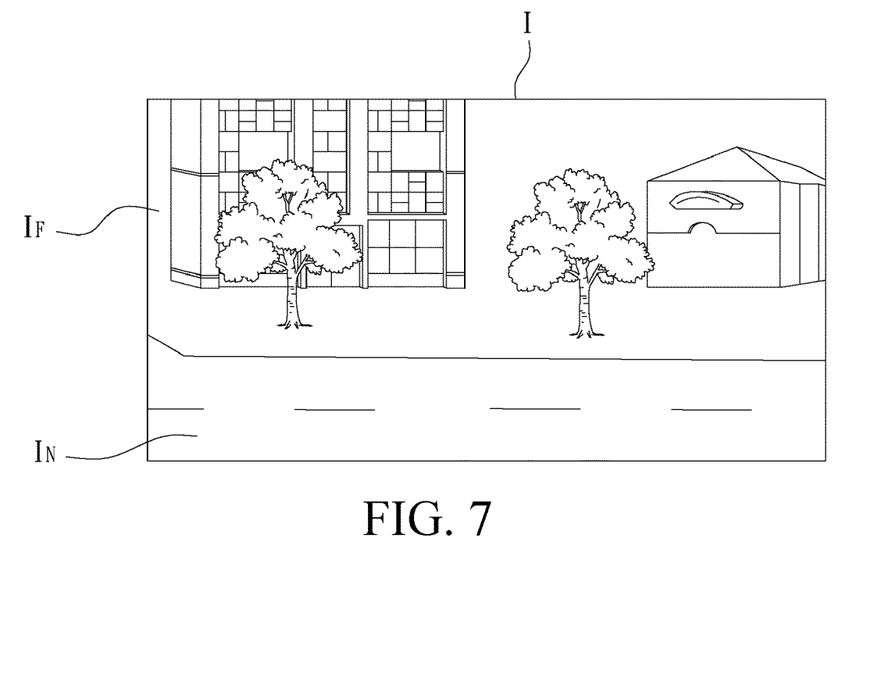
FIG. 7 is a schematic diagram of image capture in another embodiment of an in-vehicle driving image map data establishment system.
Figure 8:
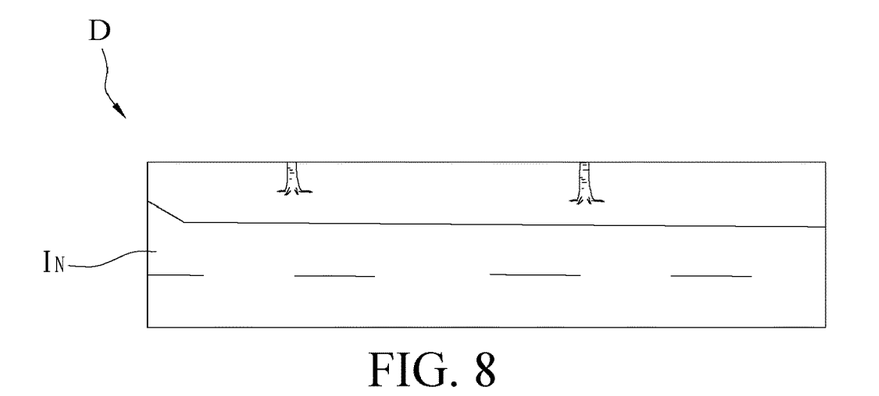
FIG. 8 is a schematic diagram of image processing in FIG. 7.

Alternatively, as shown in FIG. 7 and FIG. 8, in an embodiment, each outside-vehicle image I may include a near-field image $I_N$ and a far-field image $I_F$, and the processed image D includes only the near-field image $I_N$. For example, in this embodiment, the near-field image $I_N$ in the outside-vehicle image I is a road image relatively close to the vehicle 2, and the far-field image $I_F$ is a non-road image relatively away from the vehicle 2. After receiving the outside-vehicle image I, the image processing apparatus 50 may remove the far-field image $I_F$ to form the processed image D, so that the processed image D includes only the near-field image $I_N$. Therefore, a file size of the processed image D is less than a file size of the outside-vehicle image I. For example, a file size of the original outside-vehicle image I is 2 MB, and the file size of the processed image D may be changed to 1 MB. The image upload apparatus 40 uploads the processed image D. Therefore, compared with upload of the outside-vehicle image I, the file size of each of the outside-vehicle image I to be transmitted can be further reduced. In an embodiment, the image processing apparatus 50 may be connected to a map data library (not shown in the figure), to receive the outside-vehicle image I and identify the near-field image $I_N$ and the far-field image $I_F$ in the outside-vehicle image I. Alternatively, in another embodiment, the image processing apparatus 50 may identify the near-field image $I_N$ and the far-field image $I_F$ in the outside-vehicle image I by using a video image detection (VID) technology. This is not limited herein.

In an embodiment, after receiving the outside-vehicle images I, the image processing apparatus 50 may directly reduce resolution of the outside-vehicle images I to form the processed images D, so that resolution of each of the processed images D is less than resolution of each of the outside-vehicle images I. For example, resolution of the original outside-vehicle images I is 720P, and after processing by the image processing apparatus 50, the processed images D whose resolution is 480P can be formed. The image upload apparatus 40 uploads the processed images D. Therefore, compared with upload of the outside-vehicle images I, the file size of each of the outside-vehicle images I to be uploaded can be further reduced.

As shown in FIG. 4, in an embodiment, the control apparatus 30 may further control a transmission frequency at which the image upload apparatus 40 uploads the processed images D. For example, the control apparatus 30 controls, when the real-time vehicle speed information S is greater than a threshold, the image upload apparatus 40 to wirelessly transmit the processed images D to the outside at a transmission frequency, or the control apparatus 30 controls, when the real-time vehicle speed information S is less than the threshold, the image upload apparatus 40 to wirelessly transmit the processed images D to the outside at another transmission frequency less than the foregoing transmission frequency. For example, at least one threshold (such as 40 km/h) may be preset for the in-vehicle driving image map data establishment system 1. When the real-time vehicle speed information S is less than 40 km/h (for example, the real-time vehicle speed information S is 38 km/h), the control apparatus 30 may control the image upload apparatus 40 to wirelessly upload the processed images D at a frequency of three images per second, or when the real-time vehicle speed information S is greater than 40 km/h (for example, the real-time vehicle speed information S is 45 km/h), the control apparatus 30 may control the image upload apparatus 40 to wirelessly upload the processed images D at a frequency of five images per second. Therefore, a transmission frequency at which the image upload apparatus 40 uploads the processed images D can be adjusted according to a change of the real-time vehicle speed information S, thereby further reducing load of network bandwidth.

Still as shown in FIG. 4, in this embodiment, the in-vehicle driving image map data establishment system 1 further includes an image identification apparatus 60. The image identification apparatus 60 is electrically connected to the image capture apparatus 10 and the control apparatus 30, and the image identification apparatus 60 receives each outside-vehicle image I and correspondingly outputs a quantity of the identified objects. For example, the image identification apparatus 60 can identify an object (such as a house, a vehicle, a roadside tree, or a pedestrian) in the outside-vehicle image I by using the VID technology, to obtain the quantity of the identified objects. In addition, when the quantity of the identified objects is greater than a preset value (for example, the quantity of the identified objects is three, and the preset value is two identified objects), the control apparatus 30 controls the image capture apparatus 10 to capture the outside-vehicle images I at an adjusted frequency. The adjusted frequency is greater than the first frequency and the second frequency. That is, a larger quantity of objects (such as a house, a vehicle, a roadside tree, or a pedestrian) in the outside-vehicle images I indicates a higher frequency at which the image capture apparatus 10 captures the outside-vehicle images I under the control of the control apparatus 30, thereby preventing some objects from being omitted from the captured the outside-vehicle images I.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. An in-vehicle driving image map data establishment system, comprising:
   at least one image capture apparatus, continuously capturing and outputting a plurality of outside-vehicle images;
   a vehicle speed unit, continuously detecting and outputting real-time vehicle speed information; and
   a control apparatus, electrically connected to the image capture apparatus and the vehicle speed unit, wherein the control apparatus continuously receives the real-time vehicle speed information, and the control apparatus selectively controls, when the real-time vehicle speed information is greater than a threshold, the image capture apparatus to capture the outside-vehicle images at a first frequency, or the control apparatus selectively controls, when the real-time vehicle speed information is less than the threshold, the image capture apparatus to capture the outside-vehicle images at a second frequency, wherein the second frequency is less than the first frequency.

2. The in-vehicle driving image map data establishment system according to claim 1, further comprising an image upload apparatus, electrically connected to the control apparatus and the image capture apparatus, and receiving the outside-vehicle images, wherein the control apparatus further controls, when the real-time vehicle speed information is greater than the threshold, the image upload apparatus to wirelessly transmit the outside-vehicle images to the outside at a third frequency, or the control apparatus further controls, when the real-time vehicle speed information is less than the threshold, the image upload apparatus to wirelessly transmit the outside-vehicle images to the outside at a fourth frequency, wherein the fourth frequency is less than the third frequency.

3. The in-vehicle driving image map data establishment system according to claim 1, further comprising an image processing apparatus, electrically connected to the image capture apparatus, wherein the image processing apparatus receives the outside-vehicle images, and correspondingly outputs a plurality of processed images, and a data amount of each of the processed images is less than a data amount of each of the outside-vehicle images.

4. The in-vehicle driving image map data establishment system according to claim 3, wherein each of the processed images is combined from two adjacent outside-vehicle images.

5. The in-vehicle driving image map data establishment system according to claim 3, wherein each of the outside-vehicle images comprises a near-field image and a far-field image, and each of the processed images comprises only the near-field image.

6. The in-vehicle driving image map data establishment system according to claim 3, wherein resolution of each of the processed images is less than resolution of each of the outside-vehicle images.

7. The in-vehicle driving image map data establishment system according to claim 3, further comprising an image upload apparatus, electrically connected to the image processing apparatus, wherein the image upload apparatus wirelessly transmits the processed image to the outside.

8. The in-vehicle driving image map data establishment system according to claim 7, wherein the control apparatus is connected to the image upload apparatus, and the control apparatus controls, when the real-time vehicle speed information is greater than the threshold, the image upload apparatus to wirelessly transmit the outside-vehicle images to the outside at a third frequency, or the control apparatus further controls, when the real-time vehicle speed information is less than the threshold, the image upload apparatus to wirelessly transmit the outside-vehicle images to the outside at a fourth frequency, wherein the fourth frequency is less than the third frequency.

9. The in-vehicle driving image map data establishment system according to claim 1, further comprising an image identification apparatus, electrically connected to the image capture apparatus and the control apparatus, wherein the image identification apparatus receives each of the outside-vehicle images, and correspondingly outputs a quantity of the identified objects, and the control apparatus controls, when the quantity of the identified objects is greater than a preset value, the image capture apparatus to capture these outside-vehicle images at an adjusted frequency, wherein the adjusted frequency is greater than the first frequency and the second frequency.

10. The in-vehicle driving image map data establishment system according to claim 1, wherein there is a plurality of thresholds, and there are a plurality of first frequencies and a plurality of second frequencies.

* * * * *